(12) United States Patent
Nordbruch

(10) Patent No.: US 10,788,823 B2
(45) Date of Patent: Sep. 29, 2020

(54) HIGHLY AUTOMATED CONTROL OF A MOTOR VEHICLE

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/570,435

(22) PCT Filed: May 10, 2016

(86) PCT No.: PCT/EP2016/060417
§ 371 (c)(1),
(2) Date: Oct. 30, 2017

(87) PCT Pub. No.: WO2016/184725
PCT Pub. Date: Nov. 24, 2016

(65) Prior Publication Data
US 2018/0143626 A1    May 24, 2018

(30) Foreign Application Priority Data
May 19, 2015   (DE) .................. 10 2015 209 133

(51) Int. Cl.
*G05D 1/00*   (2006.01)
*B60W 30/00*  (2006.01)
*B60W 30/02*  (2012.01)

(52) U.S. Cl.
CPC .......... *G05D 1/0022* (2013.01); *B60W 30/00* (2013.01); *B60W 30/02* (2013.01); *G05D 1/0055* (2013.01); *G05D 2201/02* (2013.01); *G05D 2201/0213* (2013.01)

(58) Field of Classification Search
None
See application file for complete search history.

(56) References Cited

U.S. PATENT DOCUMENTS

| 5,774,069 A | 6/1998 | Tanaka et al. |
| 8,670,891 B1 * | 3/2014 | Szybalski .............. B62D 1/286 701/23 |
| 2008/0161987 A1 | 7/2008 | Breed |

(Continued)

FOREIGN PATENT DOCUMENTS

| CN | 103534741 A | 1/2014 |
| DE | 102010003740 A1 | 10/2011 |

(Continued)

OTHER PUBLICATIONS

International Search Report dated Sep. 2, 2016, of the corresponding International Application PCT/ EP2016/060417 filed May 10, 2016.

*Primary Examiner* — Lail A Kleinman
(74) *Attorney, Agent, or Firm* — Norton Rose Fulbright US LLP; Gerard Messina

(57) ABSTRACT

A method for controlling a motor vehicle includes guiding the motor vehicle on a road independently of a driver; receiving a driving instruction transmitted wirelessly from a device in a vicinity of the motor vehicle; outputting an indication of the driving instruction to a driver of the motor vehicle; determining that, for longer than a predetermined time, the driver has not taken over the guidance of the motor vehicle; and executing the driving instruction independently of the driver.

11 Claims, 3 Drawing Sheets

(56) References Cited

U.S. PATENT DOCUMENTS

| | | | |
|---|---|---|---|
| 2011/0184605 A1* | 7/2011 | Neff | G05D 1/0231 |
| | | | 701/25 |
| 2012/0083960 A1 | 4/2012 | Zhu et al. | |
| 2013/0211624 A1 | 8/2013 | Lind et al. | |
| 2014/0236387 A1* | 8/2014 | Zygmant | B64C 39/024 |
| | | | 701/2 |
| 2015/0094878 A1 | 4/2015 | Miura et al. | |
| 2015/0217763 A1* | 8/2015 | Reichel | B60W 50/0098 |
| | | | 701/23 |
| 2016/0144857 A1* | 5/2016 | Ohshima | G05D 1/0061 |
| | | | 701/23 |

FOREIGN PATENT DOCUMENTS

| | | |
|---|---|---|
| DE | 102012016802 A1 | 2/2014 |
| DE | 102013220307 A1 | 4/2015 |
| JP | 2000311299 A | 11/2000 |
| JP | 2002251690 A | 9/2002 |
| JP | 2005519804 A | 7/2005 |
| JP | 2014154128 A | 8/2014 |

* cited by examiner

HIGHLY AUTOMATED CONTROL OF A MOTOR VEHICLE

FIELD

The present invention relates to the highly automated control of a motor vehicle. In particular, the present invention relates to an interaction with an authorized entity such as a police department.

BACKGROUND INFORMATION

With the aid of a highly automated function (HAF), a motor vehicle is able to be guided independently of a driver. Notably, longitudinal control or transverse control of the motor vehicle may be carried out without the driver having to exercise a further control of the implemented function. Since in the case of an unknown situation or a malfunction, the driver is not available as fallback, HAF functions must be implemented in such a way that the motor vehicle is always in a safe state.

Some situations may be difficult for an automated system to understand. For example, a transverse control of a motor vehicle may make use of lane markings that, for instance, are scanned optically. However, if, for example, a police officer intervenes in the traffic control, then in general, it is difficult on the basis of optical data for a processing system to correctly comprehend the police officer and the driving instruction expressed by him with the aid of hand signals, for example.

German Patent Application No. 10 2010 003 740 A1 describes that an instruction be transmitted from a police car or ambulance to another motor vehicle through radio data transmission, for example.

An object of the present invention is to ensure the control of a motor vehicle with the aid of highly automated functions upon intervention in the traffic by an authorized entity. The present invention may achieves this objective. Preferred specific embodiments are described herein.

SUMMARY

An example method for controlling a motor vehicle in accordance with the present invention includes the following: guiding the motor vehicle on a road independently of a driver; receiving a driving instruction transmitted wirelessly from a device in a vicinity of the motor vehicle; outputting an indication of the driving instruction to a driver of the motor vehicle; determining that, for longer than a predetermined time, the driver has not taken over the guidance of the motor vehicle; and executing the driving instruction independently of the driver.

In this way, the motor vehicle may continue to be guided independently of the driver even if, for example, a law enforcement agent gives a driving instruction to the motor vehicle. For instance, the law enforcement agent may be an acting member of the police force, of the military police, of the Federal Office for Goods Transport, of the customs authority, of the fire department, of the Federal Agency for Technical Relief or of a rescue service. The driving instruction may thereby be followed particularly rapidly if the driver is incapable of reacting to the driving instruction in a reasonable time. As a result, the safety of the operation of the motor vehicle and of surrounding road traffic may be better ensured.

In one specific embodiment, the device is stationary relative to the road. For instance, a police officer may carry the device with him. Visual signals which are usually output to drivers of motor vehicles may thus be complemented by wireless signals to motor vehicles guided in highly automated fashion.

In another specific embodiment, the device is mounted on board a preceding or following vehicle. The vehicle may be an unmarked car, which initially may not be recognizable visually as a service vehicle. However, it may also be an official service vehicle equipped, for example, with a visual stop signaler.

In one specific embodiment, the driving instruction includes the command: Follow the further motor vehicle. In this case, the motor vehicle may be controlled so as to follow the preceding vehicle. In so doing, a safety distance to be maintained may be selected independently of the driver.

In another specific embodiment, the instruction includes: Yield the right of way to the other vehicle. The motor vehicle may be controlled so as to indicate the yield of the right of way through driving maneuvers. For example, these driving maneuvers may include a reduction in speed, driving on the right shoulder of the road or switching on a light of the motor vehicle.

In a further specific embodiment, the instruction includes: Stop the motor vehicle. In this instance, the motor vehicle may first of all select a convenient stopping place, e.g., a breakdown lane, a rest stop, a driveway or a parking spot. If a convenient place cannot be found, the motor vehicle may either coast slowly to a stop, or may be controlled so as to follow a vehicle from which the driving instruction was transmitted.

In another specific embodiment, the instruction includes: Form an emergency corridor. The motor vehicle may be controlled so as to select a right or left road shoulder in order to free the emergency corridor. In this context, the selection of the road shoulder may be made a function of a traffic lane used, a maneuver of a neighboring vehicle or a presetting.

In a further specific embodiment, an acknowledgment of the driving instruction by the driver is sensed, and the guidance of the motor vehicle is handed over to the driver. In principle, this hand-over may take place at any point in the method. In one variant, after the guidance of the motor vehicle is surrendered to the driver, it may be monitored whether the driver is observing the driving instruction. If he is not doing so, a further signal may be output to the driver. A signal may likewise be returned to the device in the vicinity of the motor vehicle, which also includes the failure of the driver to carry out the driving instruction.

The takeover of the guidance by the driver may be communicated to the entity from which the driving instruction was received. In this manner, for example, a police officer who has transmitted the driving instruction is better able to judge who is controlling the motor vehicle at the moment.

The received driving instruction may be acknowledged at the transmitting entity. The transmitting entity may thereby assume with legal security that the driver was informed of the transmitted driving instruction.

Both acknowledgments may be relevant in terms of laws, insurances and a general documentation.

A computer-program product includes program-code for carrying out the method described above when the computer-program product runs on a processing device or is stored on a computer-readable data carrier.

A controller for a motor vehicle is equipped to guide the motor vehicle on a road independently of a driver, and includes a receiving device for receiving a driving instruction transmitted wirelessly from a device in a vicinity of the motor vehicle and an output device for outputting an indication of the driving instruction to a driver of the motor vehicle. At the same time, the controller is also equipped to execute the driving instruction independently of the driver in the event that, for longer than a predetermined time, the driver has not taken over the guidance of the motor vehicle.

BRIEF DESCRIPTION OF THE DRAWINGS

The present invention is described in greater detail below with reference to the figures.

DETAILED DESCRIPTION OF EXAMPLE EMBODIMENTS

Figure 1:
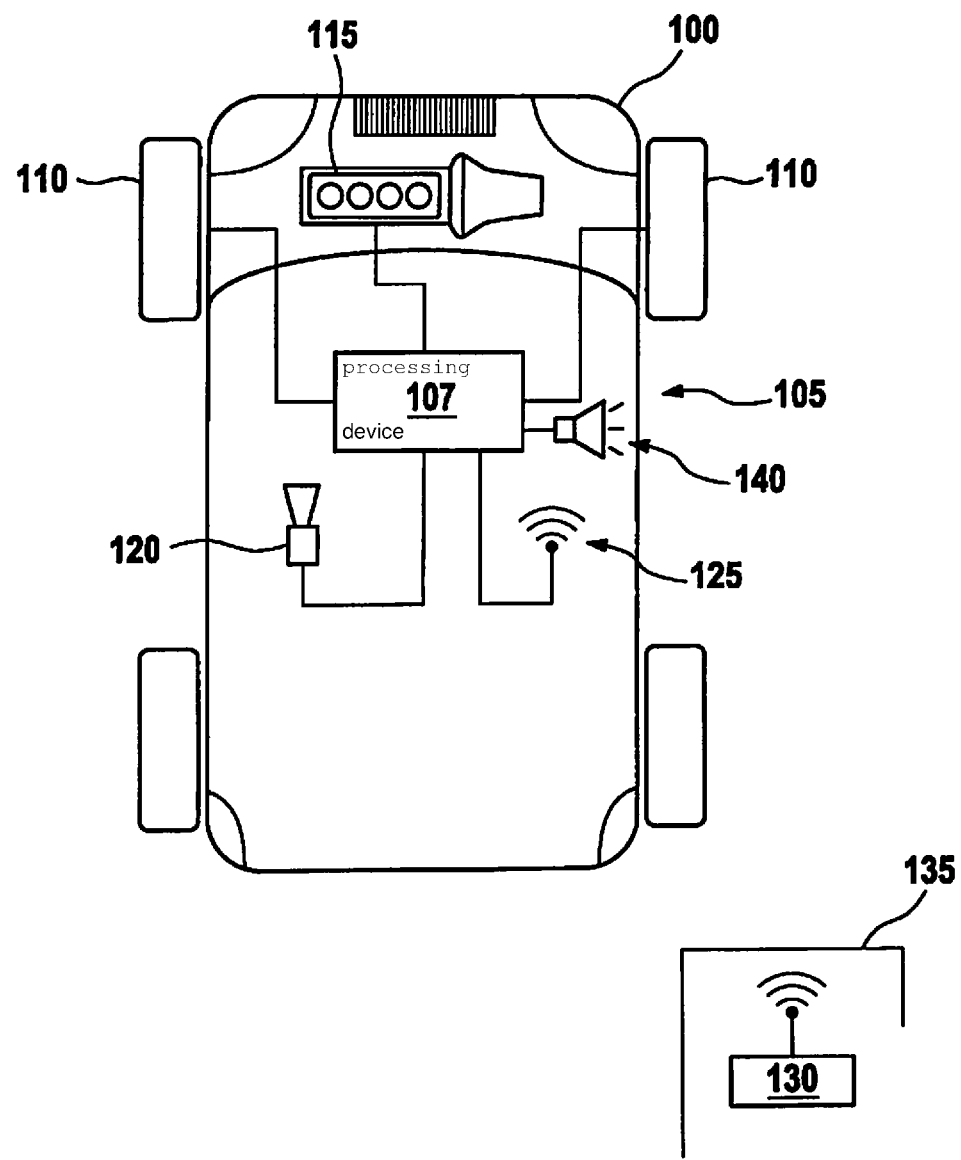
FIG. 1 shows a motor vehicle, having a controller for guiding the motor vehicle independently of a driver.

FIG. 1 shows a motor vehicle 100 having a controller 105 for guiding motor vehicle 100 independently of a driver. Controller 105 includes a processing device 107 and, in particular, is set up to involve a longitudinal control or transverse control of motor vehicle 100 without the intervention of a driver, and especially without the possibility of a rapid surrender of the control over motor vehicle 100 to the driver. In the exemplary specific embodiment shown, controller 105 is connected to a wheel 110 in order to steer or brake it. In addition, controller 105 is connected in exemplary manner to a drive engine 115 in order to control an acceleration of motor vehicle 100.

The longitudinal motion or transverse motion of motor vehicle 100 is usually controlled as a function of a control objective that may be acquired from a navigation system, for instance, and control parameters which may be scanned from a driving environment of motor vehicle 100. A camera 120 for the optical scanning of the area surrounding motor vehicle 100 is drawn in as representative for a multitude of different possible sensors. For example, in other specific embodiments, radar, lidar or ultrasonic sensors may be used.

Moreover, controller 105 includes a receiving device 125 for receiving a driving instruction transmitted wirelessly from a device 130 in the vicinity of motor vehicle 100. For instance, device 130 may include a portable, manually operated unit or, in another specific embodiment, may also be located on board a vehicle 135. The use of device 130 is usually limited to an area around motor vehicle 100 which an operator of device 130 is able to view. The wireless transmission between device 130 and motor vehicle 100 may be carried out, for example, with the aid of WLAN, Bluetooth, mobile radio communication, infrared or, in general, car-to-car (C2C) or car-to-infrastructure (C2I).

A driving instruction may be transmitted from device 130 to motor vehicle 100, which may be implemented alternatively by the driver of motor vehicle 100 or by controller 105. In this context, it is preferred that the driving instruction be transmitted in encrypted form. In addition, the driving instruction may include an identification of motor vehicle 100, e.g., its license number. Furthermore, an identification of an operator, of an organization or of further vehicle 135 may be transmitted. Controller 105 may be set up to wirelessly send back a confirmation of the receipt of the driving instruction to device 130. Preferably, this confirmation likewise takes place on an encrypted connection, and may include identifications of motor vehicle 100 and/or of device 130.

The confirmation may be sent back automatically or controlled by the driver of motor vehicle 100.

It is preferred that, with the aid of an output device 140, controller 105 inform the driver of motor vehicle 100 of an arrived driving instruction. For that purpose, for example, the driving instruction may be output as spoken text or as an audio signal. In addition or alternatively, a visual output may also be implemented, e.g., as instruction text or as symbol.

Preferably, controller 105 is equipped to implement a received driving instruction automatically if, for longer than a predetermined time, the driver has not taken over motor vehicle 100 and/or, for longer than a predetermined time, the driving instruction has not been implemented by the driver.

Figure 2:
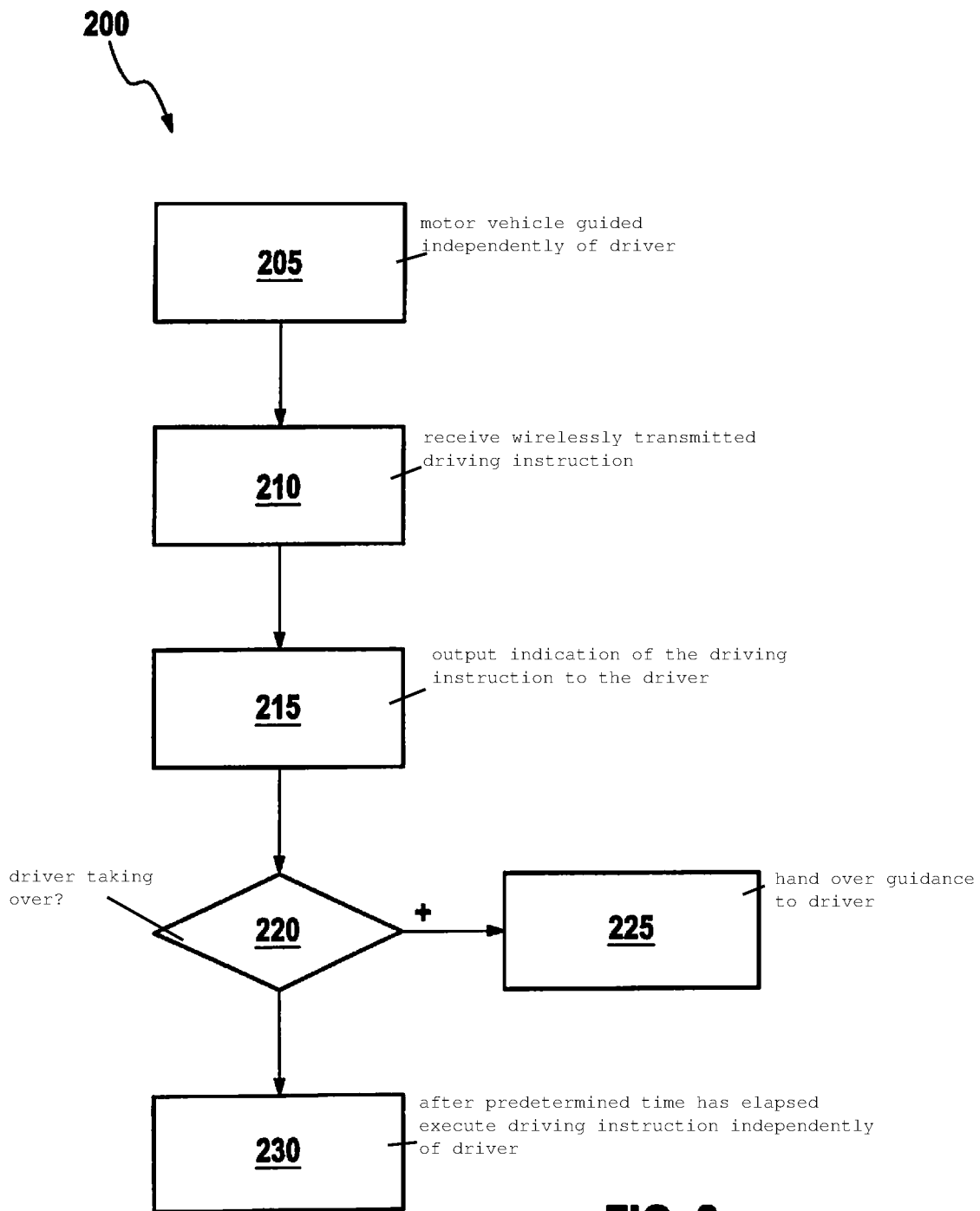
FIG. 2 shows a flowchart of a method for controlling the motor vehicle from FIG. 1.

FIG. 2 shows a flowchart of a method 200 for controlling motor vehicle 100 from FIG. 1. Method 200 is created especially for execution on processing device 107 of controller 105.

In a first step 205, motor vehicle 100 is guided independently of a driver. In particular, the guidance may include longitudinal control and/or transverse control of motor vehicle 100 on a road. In a step 210, a wirelessly transmitted driving instruction is received. In one specific embodiment, a confirmation of the received driving instruction may be sent back. Furthermore, in a step 215, an indication of the driving instruction is output to the driver of motor vehicle 100.

In a step 220, it is checked whether the driver is taking over the guidance of motor vehicle 100. This may be effected, for instance, by actuation of an input component such as a pushbutton switch or by operation of a control component such as a gas pedal or brake pedal, a steering wheel or a gear selector. In this case, in a step 225, the guidance of motor vehicle 100 is handed over to the driver. If the driver assumes the guidance of motor vehicle 100, this circumstance may then be communicated back to the component from which the driving instruction was received. In one specific embodiment, it may also be communicated that the driver has not (yet) taken over the guidance.

On the other hand, if it is determined in step 220 that the driver is not taking over the guidance, then after a predetermined time has elapsed, in a step 230, the received driving instruction may be executed independently of the driver. As was described in greater detail above, the driving instruction may include, for example, to follow further vehicle 135, to yield the right of way to other vehicle 135, to stop motor vehicle 100 or to form an emergency corridor.

In another specific embodiment, the driver is also able to accelerate the transition from step 220 to step 230 by giving his/her consent to the execution of the received driving instruction, e.g., by actuating a predetermined switch or pushbutton.

Controller 105 from FIG. 1 and method 200 from FIG. 2 are capable of dealing in automated fashion with an intervention in road traffic by a person authorized to do so. To that end, it is necessary that the driving instruction be transmitted in a manner other than the usual visual manner.

Figure 3:
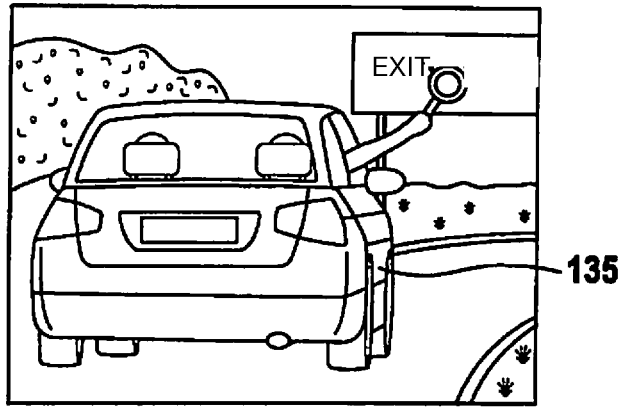
FIG. 3 shows exemplary signals of authorized persons.
Figure 3:
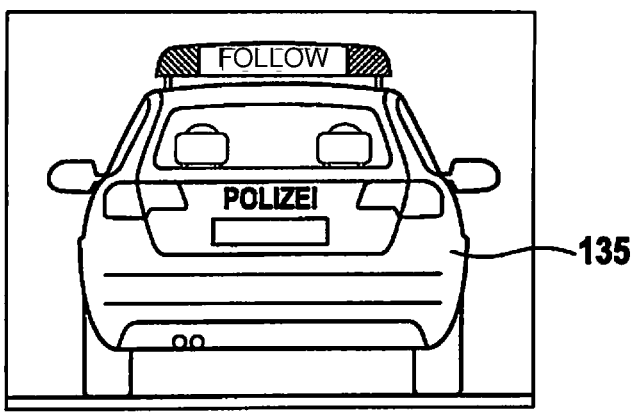
Figure 3:

For comparison, FIG. 3 shows driving instructions communicated in the traditional manner by authorized persons, using the present example of acting members of the police force. In the top representation, a so-called signaling disk is held out of an unmarked police vehicle to indicate that the following vehicle is to follow vehicle 135 and possibly to stop. In the middle representation, the driving instruction is output by a brief text message on a stop signaler on the roof of further vehicle 135. In this case, further vehicle 135 is clearly recognizable as an official police vehicle.

In the bottom representation of FIG. 3, a person is shown wearing a warning vest that makes the person recognizable as a police officer. The police officer is holding a signaling disk, and at the same time, is giving a hand signal to cause motor vehicle 100 approaching him to stop.

Conventionally, the driving instructions illustrated in FIG. 3 can only be sensed or recognized optically with great difficulty. In accordance with the present invention, it is therefore provided that to influence a motor vehicle 100 guided independently of a driver, in addition or as an alternative to the familiar signals, to transmit driving instructions wirelessly through radio data transmission, for example. A controller 105 on board motor vehicle 100 is then able to execute the received driving instruction itself, or to prompt a driver of motor vehicle 100 to do so.

What is claimed is:

1. A method for controlling a motor vehicle, the method comprising:
    guiding the motor vehicle on a road independently of a driver;
    receiving a driving instruction transmitted wirelessly from a device external to and in a vicinity of the motor vehicle;
    outputting an indication of the driving instruction to a driver of the motor vehicle;
    transmitting to the device a confirmation that the driving instruction has been received;
    determining that, for longer than a predetermined time, the driver has not taken over the guidance of the motor vehicle;
    after the predetermined time has expired, transmitting, by the motor vehicle and to the device, a communication indicating that the driver has not taken over the guidance of the motor vehicle; and
    when the driver has not taken over the guidance of the motor vehicle for longer than the predetermined time, executing the driving instruction independently of the driver.

2. The method as recited in claim 1, wherein the device is stationary relative to the road.

3. The method as recited in claim 1, wherein the device is mounted onboard a further vehicle, the further vehicle being one of a preceding or following vehicle.

4. The method as recited in claim 3, wherein the driving instruction includes: Follow the further vehicle.

5. The method as recited in claim 1, wherein the driving instruction includes: Yield the right of way to another further vehicle.

6. The method as recited in claim 1, wherein the driving instruction includes: Stop the motor vehicle.

7. The method as recited in claim 1, wherein the driving instruction includes: Form an emergency corridor.

8. The method as recited in claim 1, further comprising:
    sensing that the driving instruction has been acknowledged by the driver, and surrendering the guidance of the motor vehicle to the driver.

9. The method as recited in claim 1, wherein the received driving instruction is acknowledged at a transmitting entity.

10. A non-transitory computer-readable data carrier on which is stored a computer program having program-code for controlling a motor vehicle, the program code, when executed by a processing device, causing the processing device to perform:
    guiding the motor vehicle on a road independently of a driver;
    receiving a driving instruction transmitted wirelessly from a device external to and in a vicinity of the motor vehicle;
    outputting an indication of the driving instruction to a driver of the motor vehicle;
    transmitting to the device a confirmation that the driving instruction has been received;
    determining that, for longer than a predetermined time, the driver has not taken over the guidance of the motor vehicle;
    after the predetermined time has expired, transmitting, by the motor vehicle and to the device, a communication indicating that the driver has not taken over the guidance of the motor vehicle; and
    when the driver has not taken over the guidance of the motor vehicle for longer than the predetermined time.

11. A controller for a motor vehicle, the controller being equipped to guide the motor vehicle on a road independently of a driver, the controller comprising:
    a receiving device to receive a driving instruction transmitted wirelessly from a device external to and in a vicinity of the motor vehicle; and
    an output device to output an indication of the driving instruction to a driver of the motor vehicle;
    wherein the controller is equipped to execute the driving instruction independently of the driver in the event that, for longer than a predetermined time, the driver has not taken over the guidance of the motor vehicle; and
    a transmitting device for transmitting, by the motor vehicle and to the device, a confirmation that the driving instruction has been received and for transmitting, after the predetermined time has expired, to the device a communication indicating that the driver has not taken over the guidance of the motor vehicle.

* * * * *